United States Patent Office 2,816,132
Patented Dec. 10, 1957

2,816,132

(4-METHYL-3-PENTENYL)-3-CYCLOHEXENE-1-ACRYLATES

Walter B. Trapp and Donald E. Pletcher, Midland, Mich., assignors to The Dow Chemical Company, Midland, Mich., a corporation of Delaware No Drawing. Application August 17, 1956, Serial No. 604,604

5 Claims. (Cl. 260—468)

This invention is concerned with cyclohexeneacrylic acid compounds having a general structure

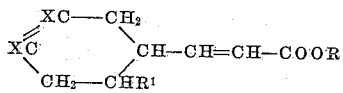

In this and succeeding formulae, one X represents hydrogen, the other X represents a 4-methyl-3-pentenyl radical, R represents a member of the group consisting of hydrogen and lower alkyl radicals containing from 1 to 4 carbon atoms, inclusive, and R' represents a member of the group consisting of hydrogen and methyl.

The products of this invention are light-colored liquids generally soluble in organic solvents such as benzene, ethyl acetate and alcohol, and substantially insoluble in water. These compounds are useful as active components of perfume aromatics. They are also useful as parasiticides and are particularly adapted to be employed as toxic constituents in fungicidal and bactericidal compositions. In addition, these compounds may be employed as herbicides for the control of undesired vegetation.

The acids of this invention having the structure

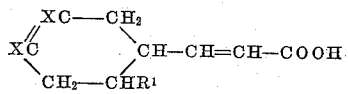

may be prepared by the reaction of a (4-methyl-3-pentenyl)-3-cyclohexene-1-carboxaldehyde having the formula

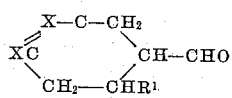

with malonic acid to produce the desired (4-methyl-3-pentenyl)-3-cyclohexene-1-acrylic acid, water of reaction and carbon dioxide.

In the synthesis good results are obtained when substantially equimolar proportions of the reactants are employed. The reaction is carried out in the presence of a basic catalyst such as piperidine and trimethylamine. A solvent may be employed as reaction medium. Suitable solvents include pyridine, picoline, and benzene. In the preferred method, a pyridine solvent and piperdine catalyst are employed.

In carrying out the reaction, the (4-methyl-3-pentenyl)-3-cyclohexene-1-carboxaldehyde reactant is added to a solution of malonic acid and pyridine. The mixture is then cooled to below room temperature and the piperidine catalyst added thereto. The resulting mixture is then allowed to warm gradually to room temperature and finally heated in the temperature range of from 80° to 95° C. until the evolution of carbon dioxide ceases. The mixture is then cooled to about room temperature and aqueous alkali added thereto to neutralize acidic material. The resulting alkaline solution is extracted several times with benzene to remove non-acidic constituents. The residual aqueous portion is then heated to distill out the pyridine and water and to obtain as residue the sodium salt of the desired acid product. Dilute mineral acid such as sulfuric acid is added to this residue to form the desired (4-methyl-3-pentenyl)-3-cyclohexene-1-acid product. The latter may be purified by conventional procedures such as distillation under reduced pressure.

The esters of this invention having the structure

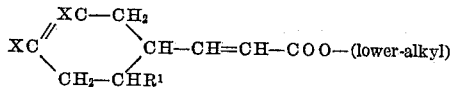

may be prepared by the esterification of the appropriate acrylic acid product with a lower aliphatic alcohol.

In the latter synthesis, good results are obtained when equimolar amounts of the reactant or an excess of the alcohol are employed. The reaction is carried out in the presence of esterification catalysts such as a mineral acid or an acidic resin. The preferred catalysts include sulfuric acid and Dowex 50 resin (a sulfonated styrene-divinylbenzene copolymer).

In carrying out the reaction, the appropriate acid and alcohol are heated together in the presence of a catalyst and under reflux from a period of from 7 to 20 hours. The mixture is then cooled, the catalyst removed or neutralized with aqueous sodium acetate. The neutral solution is fractionally distilled under reduced pressure to obtain the desired ester product. If desired, benzene may be added to the mixture before fractional distillation to remove the water as a benzene-water azeotrope.

The following examples illustrate the invention, but are not to be construed as limiting.

*Example 1.—x-(4-methyl-3-pentenyl)-3-cyclohexene-1-acrylic acid*

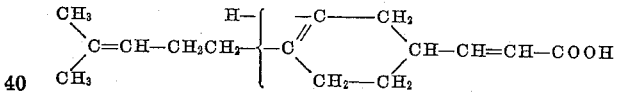

192 grams (1 mole) of x-(4-methyl-3-pentenyl)-3-cyclohexene-1-carboxaldehyde was mixed with a solution of 104 grams (1 mole) of malonic acid in 150 grams of pyridine, the resulting mixture cooled in an ice bath and a few drops of piperidine added thereto. The mixture was then allowed to warm gradually to room temperature, and thereafter heated on the steam bath at 80° to 90° C. until no more carbon dioxide was evolved. The mixture was then combined with 800 milliliters of 10 percent sodium hydroxide and the resulting alkaline solution extracted 3 times with benzene. The aqueous portion was heated under 70 millimeters pressure to distill off the pyridine and part of the water. The residual solution was neutralized with dilute sulfuric acid to obtain a crude x-(4-methyl-3-pentenyl)-3-cyclohexene-1-acrylic acid product. The latter was extracted from the mixture with benzene and the benzene solvent distilled to obtain a purified product boiling at 166°–167° C. at 1 millimeter pressure. The latter had a refractive index, $n_D^{25°\ C.}$ of 1.513 and a specific gravity of 0.995 at 25° C./4° C.

*Example 2.—Methyl x-(4-methyl-3-pentenyl)-3-cyclohexene-1-acrylate*

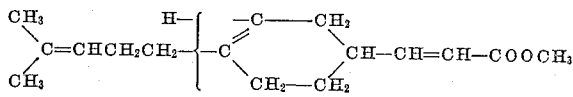

37 grams (0.158 mole) of x-(4-methyl-3-pentenyl)-3-cyclohexene-1-acrylic acid prepared as described in Example 1, 65 grams (2 moles) of methanol and 4 drops of sulfuric acid were mixed together and the resulting mixture refluxed for 8 hours. At the end of this period, the mixture was neutralized with sodium acetate and fractionally distilled to obtain a methyl $x$-(4-methyl-3-pentenyl) - 3 - cyclohexene - 1 - acrylate product boiling at 134° C. at 0.9 millimeter pressure. This product had a refractive index, $n_D^{25°\,C.}$ of 1.498 and a specific gravity of 0.969 at 25° C./4° C.

*Example 3.—6 - methyl-x-(4-methyl-3-pentenyl)-3-cyclohexene-1-acrylic acid*

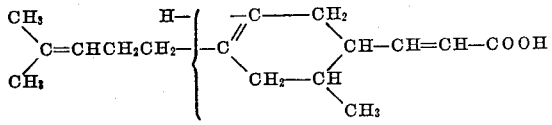

155 grams (0.75 mole) of 6-methyl-$x$-(4-methyl-3-pentenyl)-3-cyclohexene-1-carboxaldehyde was added to a solution of 78 grams (0.75 mole) of malonic acid in 115 grams of pyridine. The resulting mixture was cooled in an ice bath and a few drops of piperidine added thereto. The reaction mixture was then gradually heated to 80°–90° C. on the steam bath, and the heating continued until the evolution of carbon dioxide ceased. The mixture was then fractionally distilled to obtain a 6-methyl-$x$-(4-methyl-3-pentenyl)-3-cyclohexene - 1-acrylic acid product boiling at 173°–175° C. at 1.2 millimeters' pressure. This product had a refractive index, $n_D^{25°\,C.}$ of 1.509, and a specific gravity of 0.991 at 25° C./4° C.

*Example 4.—Methyl 6-methyl-x-(4-methyl-3-pentenyl)-3-cyclohexene-1-acrylate*

40 grams (0.16 mole) of 6-methyl-$x$-(4-methyl-3-pentenyl)-3-cyclohexene-1-acrylic acid prepared as described in Example 3, 64 grams (2 moles) of methanol and 20 drops of concentrated sulfuric acid were mixed together and refluxed for 12 hours. At the end of this period, the reaction mixture was neutralized with sodium acetate. The neutralized solution was mixed with benzene and heated to remove the water as a benzene-water azeotrope. The residue was fractionally distilled to obtain a methyl 6-methyl-$x$-(4-methyl-3-pentenyl)-3-cyclohexene-1-acrylate product boiling at 149°–155° C. at 2.1–2.3 millimeters' pressure, having a refractive index, $n_D^{25°\,C.}$ of 1.496, and a specific gravity of 0.995 at 25° C./4° C.

The products of this invention are useful as perfume aromatics and are adapted to be employed in compositions where introduction of artificial odor is desired. Further, these compounds are useful as parasiticides and are adapted to be employed as toxic constituents in bactericidal preparations. In a representative operation, 6-methyl-$x$-(4-methyl - 3 - pentenyl)-3-cyclohexene-1-acrylic acid was added to nutrient agar media to give a concentration of 50 parts per million and the media inoculated with *Staphylococcus aureus* and incubated at 30° C. for 4 days. At the end of this period complete inhibition of growth of the test organism was observed.

The new compounds are also useful as agricultural fungicides. In a representative operation, essentially complete controls were obtained when tomato plants were sprayed with compositions containing 1 pound of 6-methyl-$x$-(4-methyl - 3 - pentenyl)-3-cyclohexene-1-acrylic acid per 100 gallons of aqueous dispersion, and the plants thereafter inoculated with spores of the causative organism of tomato early blight (*Alternaria solani*).

The starting $x$-(4-methyl-3-pentenyl)-3-cyclohexene-1-carboxaldehyde employed in this invention may be prepared by heating together under pressure, 2-(4-methyl-3-pentenyl)-1,3-butadiene and the appropriate $\alpha,\beta$-unsaturated aldehyde such as acrolein or crotonaldehyde in the presence of a polymerization inhibitor such as 4-tertiary-butylcatechol until a pressure drop is noted. The reaction mixture may then be distilled to obtain the desired $x$-(4-methyl-3-pentenyl)-3 - cyclohexene-1-carboxaldehyde. The $x$-(4-methyl-3-pentenyl)-3-cyclohexene-1-carboxaldehyde has a boiling point of 108° C. at 2.5 millimeters' pressure and a refractive index, $n_D^{25°\,C.}$ of 1.448.

The 6 - methyl-$x$-(4-methyl-3-pentenyl)-3-cyclohexene-1-acrylic acid has a boiling point of 134° C. at 4 millimeters' pressure and a refractive index, $n_D^{25°\,C.}$ of 1.486.

We claim:

1. A compound having the general formula

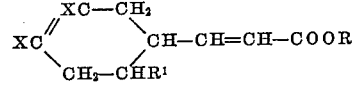

wherein one X represents hydrogen, the other X represents a 4-methyl-3-pentenyl radical, R represents a member of the group consisting of hydrogen and lower alkyl radicals containing from 1 to 4 carbon atoms, inclusive, and R' represents a member of the group consisting of hydrogen and methyl.

2. An $x$-(4-methyl-3-pentenyl)-3-cyclohexene-1-acrylic acid product having a refractive index, $n_D^{25°\,C.}$ of 1.513 and a specific gravity of 0.995 at 25° C./4° C.

3. A methyl $x$-(4-methyl-3-pentenyl)-3-cyclohexene-1-acrylate product having a refractive index, $n_D^{25°\,C.}$ of 1.498 and a specific gravity of 0.969 at 25° C./4° C.

4. A 6-methyl-$x$-(4-methyl-3-pentenyl)-3-cyclohexene-1-acrylic acid product having a refractive index, $n_D^{25°\,C.}$ of 1.509 and a specific gravity of 0.991 at 25° C./4° C.

5. A methyl 6-methyl-$x$-(4-methyl-3-pentenyl)-3-cyclohexene-1-acrylate product having a refractive index, $n_D^{25°\,C.}$ of 1.496 and a specific gravity of 0.995 at 25° C./4° C.

References Cited in the file of this patent

UNITED STATES PATENTS

| | | |
|---|---|---|
| 2,363,501 | Coleman et al. | Nov. 28, 1944 |
| 2,382,803 | Miller et al. | Aug. 14, 1945 |